United States Patent
Panje (10) Patent No.: US 11,611,904 B2
(45) Date of Patent: Mar. 21, 2023

(54) OPTIMIZED DATA COLLECTION IN A WIRELESS NETWORK

(71) Applicant: ARRIS Enterprises LLC, Suwanee, GA (US)

(72) Inventor: Krishna Prasad Panje, Bengaluru (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/243,756

(22) Filed: Apr. 29, 2021

(65) Prior Publication Data

US 2021/0345170 A1  Nov. 4, 2021

Related U.S. Application Data

(60) Provisional application No. 63/019,566, filed on May 4, 2020.

(51) Int. Cl.
| | |
|---|---|
| *H04W 28/06* | (2009.01) |
| *H04B 17/318* | (2015.01) |
| *H04W 24/08* | (2009.01) |
| *H04W 88/16* | (2009.01) |

(52) U.S. Cl.
CPC .......... *H04W 28/06* (2013.01); *H04B 17/318* (2015.01); *H04W 24/08* (2013.01); *H04W 88/16* (2013.01)

(58) Field of Classification Search
CPC ..... H04W 28/06; H04W 24/08; H04W 88/16; H04B 17/318
See application file for complete search history.

(56) References Cited

U.S. PATENT DOCUMENTS

| | | | | |
|---|---|---|---|---|
| 6,067,460 A | * | 5/2000 | Alanara | H04W 52/0245 455/574 |
| 8,223,692 B2 | * | 7/2012 | Shen | H04W 64/006 370/328 |
| 2010/0267397 A1 | * | 10/2010 | Shen | H04W 64/006 455/456.1 |

(Continued)

OTHER PUBLICATIONS

International Preliminary Report on Patentability dated Nov. 8, 2022 in International (PCT) Application No. PCT/US2021/029825.

(Continued)

*Primary Examiner* — Christopher M Crutchfield
*Assistant Examiner* — Tito Q Pham
(74) *Attorney, Agent, or Firm* — Wenderoth, Lind & Ponack, L.L.P.

(57) ABSTRACT

An apparatus, method, and computer-readable recording medium perform optimized data collection in a wireless network. The wireless network communicatively interconnects a gateway device having a network controller, one or more wireless extenders, and one or more client devices. The gateway device receives polling responses from the one or more wireless extenders and periodically monitors station metrics data for the one or more client devices based on the polling responses. The gateway device determines which of the one or more client devices is an immobile device based on the station metrics data, and transmits an instruction to at least one wireless extender for modifying collection or reporting of the station metrics data for any client device determined to be an immobile device.

20 Claims, 4 Drawing Sheets

(56) References Cited

U.S. PATENT DOCUMENTS

| | | | |
|---|---|---|---|
| 2012/0307791 A1* | 12/2012 | Veres | H04W 36/32 |
| | | | 370/331 |
| 2013/0154882 A1* | 6/2013 | Young | G01S 5/0221 |
| | | | 342/451 |
| 2013/0331119 A1* | 12/2013 | Vaccari | H04W 52/0261 |
| | | | 455/456.1 |
| 2014/0221022 A1* | 8/2014 | Vaccari | G06Q 30/02 |
| | | | 455/456.6 |
| 2016/0219452 A1* | 7/2016 | Zingler | H04W 56/001 |
| 2017/0127449 A1* | 5/2017 | Wang | H04W 74/0816 |
| 2017/0265088 A1* | 9/2017 | Tsuda | H04W 24/10 |
| 2018/0206133 A1* | 7/2018 | Venkatraman | H04L 47/29 |
| 2018/0279143 A1* | 9/2018 | Bhattad | H04W 52/325 |
| 2018/0279375 A1* | 9/2018 | Jeon | H04W 74/0833 |
| 2018/0352493 A1 | 12/2018 | Strater et al. | |
| 2019/0094877 A1* | 3/2019 | Smith | G01S 7/06 |

OTHER PUBLICATIONS

International Search Report and the Written Opinion of the International Searching Authority dated Aug. 11, 2021 in International (PCT) Application No. PCT/US2021/029825.

\* cited by examiner

OPTIMIZED DATA COLLECTION IN A WIRELESS NETWORK

TECHNICAL FIELD

The subject matter of the present disclosure relates generally to monitoring and management of wireless devices in wireless networks.

BACKGROUND

There has been a rapid rise in the use of wireless devices in wireless networks, which has increased traffic drastically, degraded the quality of service, and reduced the coverage capabilities of many network devices (e.g., gateways, access points, and wireless extenders). The wireless industry recognized these issues and developed standards for wireless routing protocols such as a multi-access point (MAP) or mesh protocol, which allows for wireless devices to communicate with each other using optimal paths for relaying data in the wireless network. The MAP or mesh protocol defines the control protocols and the data objects necessary to enable onboarding, provisioning, control, and management of wireless devices in a wireless network.

A wireless network implementing the MAP or mesh protocol (e.g., MAP or mesh network) generally includes the use of a MAP control device. Additionally, wireless management functions can be provided for the MAP control device for management of the MAP or mesh network to improve quality of experience (QoE) for users. In a typical MAP or mesh network, there can be multiple wireless extenders along with the MAP control device at different places in order to have seamless coverage orchestrated by the MAP controller.

With cloud-based, or MAP or mesh network management control, an important aspect is the collection of strategic parameters from wireless extenders to enable seamless roaming with better QoE. These parameters are related to the wireless stations or client devices connected to the wireless extenders. Typical households can contain ten or more (wireless) Wi-Fi devices including mobile devices as well as other devices such as a TV, a set-top box (STB), media players, smart media players (SMDs), and internet-of-things (IoT) devices.

Some of these Wi-Fi devices are not considered mobile devices or are considered immobile devices (e.g., TVs, STBs, SMDs, and a wide range of IoT devices), but are included with the typical station parameter collection by the wireless extenders (e.g., such that all the station parameter data event handling is performed by the wireless extenders). Additionally, typical station parameter collection by the wireless extenders can result in timely and required reporting operations by the wireless extenders.

Thus, the immobile devices in the wireless network can negatively influence roaming and steering operations and unnecessarily overload the wireless extenders and the MAP control device (e.g., immobile devices rarely require roaming and steering operations). Overloading on the wireless extenders and the MAP control device can cause important wireless devices (e.g., requiring roaming and steering operations) to receive delayed roaming and steering operations, thereby negatively affecting QoE.

Thus, it would be advantageous and an improvement over the relevant technology to provide an apparatus, method, and/or program for providing optimized data collection in a wireless network by automatically reducing the burden on wireless extenders, backhaul and control devices caused by immobile devices, such that overall system performance and QoE in the wireless network is improved.

SUMMARY

An aspect of the present disclosure provides a gateway device for optimized data collection in a wireless network. The wireless network is configured to communicatively interconnect the gateway device, one or more wireless extenders, and one or more client devices. The gateway device includes a network controller, a non-transitory memory storing a program, and a communication interface configured to establish communication connections with the one or more client devices and one or more wireless extenders via the wireless network. The network controller can be a multi-access point controller, mesh network controller, or cloud-based controller.

The network controller is configured to execute the program to: receive, using the communication interface, polling responses from the one or more wireless extenders; and periodically monitor, using the network controller, station metrics data for the one or more client devices based on the polling responses. The gateway device is further configured to determine, using the network controller, which of the one or more client devices is an immobile device based on the station metrics data; and transmit, using the communication interface, an instruction to at least one wireless extender for modifying collection or reporting of the station metrics data for any client device determined to be the immobile device.

In an aspect of the present disclosure, the network controller periodically monitors the station metrics data, which includes a received signal strength indicator (RSSI), and the network controller determines which of the one or more client devices is the immobile device based on a rate of change of the RSSI being less than a predetermined threshold during a period of time.

In an aspect of the present disclosure, the network controller periodically monitors the station metrics data, which includes a non-associated (NA)-RSSI and a NA station list, and the network controller determines which of the one or more client devices is the immobile device based on a rate of change of the NA-RSSI with respect to the NA station list being less than a predetermined threshold during a period of time.

In an aspect of the present disclosure, the network controller periodically monitors the station metrics data, which includes data uplink rate or data bytes transmitted, and the network controller determines which of the one or more client devices is the immobile device based on the data uplink rate or data bytes transmitted being less than a predetermined threshold during a period of time.

In an aspect of the present disclosure, the network controller periodically monitors the station metrics data, which includes a steer count, and the network controller determines which of the one or more client devices is the immobile device based on the steer count being less than a predetermined threshold during a period of time.

In an aspect of the present disclosure, the gateway device periodically monitors the metrics data, which includes data traffic level or data bytes downloaded, and the network controller determines which of the one or more client devices is the immobile device based on the data traffic level or data bytes downloaded being greater than a predetermined threshold during a period of time.

In an aspect of the present disclosure, the instruction transmitted to at least one wireless extender includes a command to re-configure the at least one wireless extender, and the collection or the reporting of the station metrics data is modified by reducing the parameter collection or reducing the reporting by the at least one wireless extender for any client device determined to be the immobile device.

An aspect of the present disclosure provides a method for optimized data collection in a wireless network. The wireless network is configured to communicatively interconnect a gateway device, one or more wireless extenders, and one or more client devices. The method includes receiving, at the one or more wireless extenders, probe requests from the one or more client devices; receiving, at the one or more client devices, data via the one or more wireless extenders; and receiving, at the gateway device, polling responses from the one or more wireless extenders.

The method also includes periodically monitoring, at gateway device, station metrics data for the one or more client devices based on the polling responses and determining which of the one or more client devices is an immobile device based on the station metrics data; and transmitting, from the gateway device, an instruction to at least one wireless extender for modifying collection or reporting of the station metrics data for any client device determined to be the immobile device.

In an aspect of the present disclosure, the periodically monitoring of station metrics data includes monitoring: 1) a rate of change of a received signal strength indicator (RSSI) being less than a predetermined threshold during a period of time; 2) a rate of change of a non-associated (NA)-RSSI with respect to a NA station list being less than a predetermined threshold during a period of time; 3) a data uplink rate or data bytes transmitted being less than a predetermined threshold during a period of time; 4) a steer count being less than a predetermined threshold during a period of time; 5) or a data traffic level or data bytes downloaded being greater than a predetermined threshold during a period of time.

In an aspect of the present disclosure, the transmitting of the instruction to the at least one wireless extender includes transmitting a command to re-configure the at least one wireless extender, and the collection or reporting of the station metrics data is modified by reducing the parameter collection or reducing the reporting by the at least one wireless extender for any client device determined to be an immobile device.

In an aspect of the present disclosure provides a non-transitory computer-readable recording medium in a wireless device for optimizing data collection in a wireless network. The wireless network is configured to communicatively interconnect the wireless device having a network controller, one or more wireless extenders, and one or more client devices. The non-transitory computer-readable recording medium storing one or more programs which when executed by the network controller performs steps of the methods described above.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

The terms and words used in the following description and claims are merely used to enable a clear and consistent understanding of the present disclosure. Accordingly, it should be apparent to those skilled in the art that the following description of the present disclosure is provided for illustration purposes only, and not for the purpose of limiting the present disclosure as defined by the appended claims and their equivalents.

Figure 1:
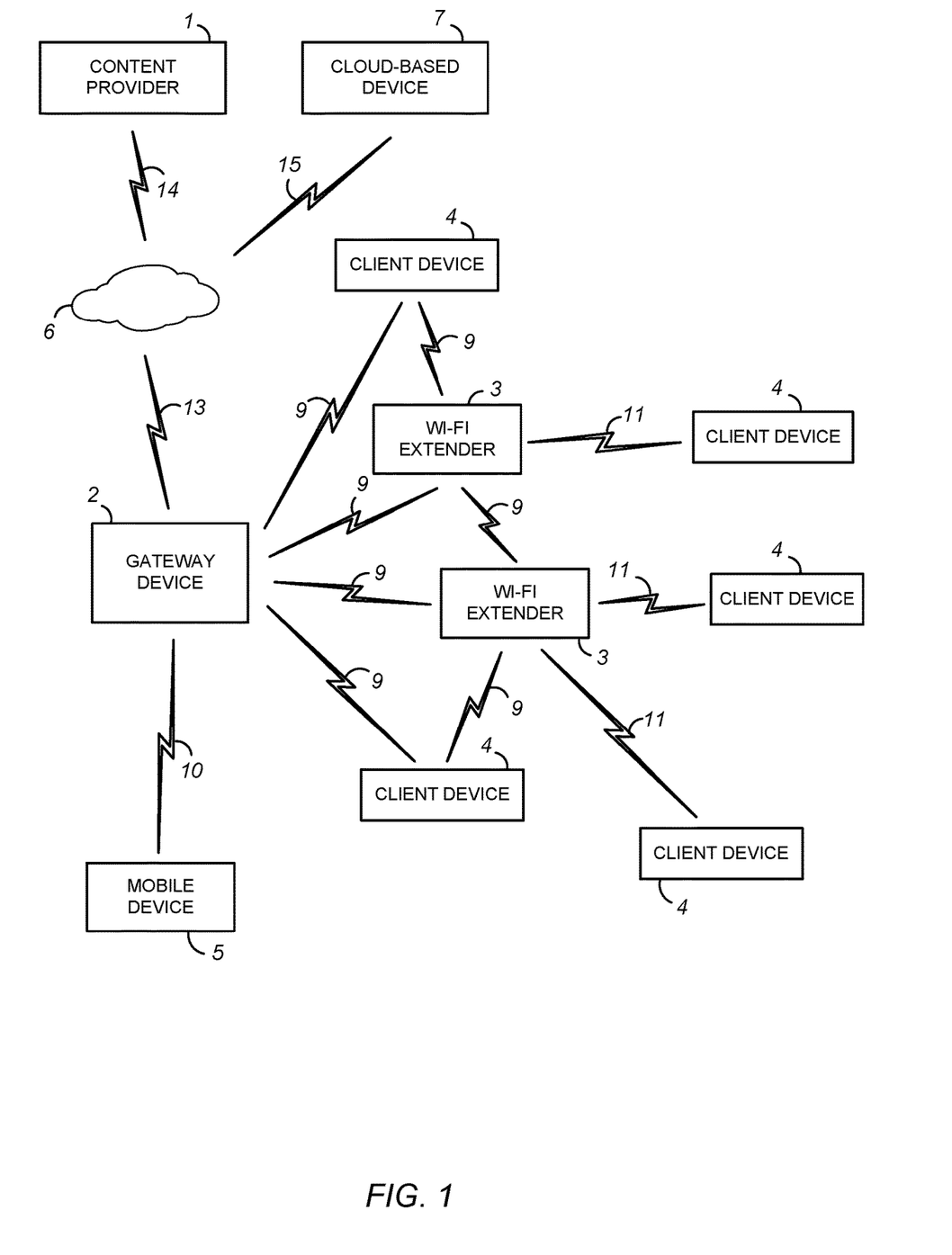
FIG. 1 is a schematic diagram of a system according to an embodiment of the present disclosure.

FIG. 1 is a schematic diagram of a system according to an embodiment of the present disclosure.

As shown in FIG. 1, the main elements of the system include a gateway device 2 connected to a content provider 1 and a cloud-based device 7 via the Internet 6 and also connected to different wireless devices such as wireless extenders 3 and client devices 4. Additionally, the gateway device 2 is connected wirelessly to a mobile device 5. The system shown in FIG. 1 includes wireless devices (e.g., extenders 3, client devices 4, and mobile device 5) that may be connected in one or more wireless networks (e.g., private, guest, iControl, backhaul network, or Internet of things (IoT) network) within the system. Additionally, there could be some overlap between wireless devices (e.g., extenders 3, client devices 4, and mobile device 5) in the different networks. That is, one or more network devices could be located in more than one network. For example, the wireless extenders 3 could be located both in a private network for providing content and information to a client device 4 and also included in a backhaul network or an iControl network.

Starting from the top of FIG. 1, the content provider 1 can be, for example, a cable television provider, a satellite television provider, an internet service provider, or a multiple system operator (MSO). The connection 14 between the Internet 6 and the content provider 1 can be implemented using a wide area network (WAN), a virtual private network (VPN), metropolitan area networks (MANs), system area networks (SANs), a DOCSIS network, a fiber optics network (such as FTTH (fiber to the home), FTTX (fiber to the x), or HFC (hybrid fiber-coaxial)), a public switched data network (PSDN), a global Telex network, or a 2G, 3G, 4G or 5G network, for example. The cloud-based device 7 can be, for example, a network server or personal computer (PC) having a network controller for assisting, if necessary, in the management (e.g., steering/roaming) of wireless devices in the system. The connection 15 between the Internet 6 and the cloud-based device 7 can also be implemented using a WAN, a VPN, MANs, SANs, a DOCSIS network, a fiber optics network (such as FTTH, FTTX, or HFC), a PSDN, a global Telex network, or a 2G, 3G, 4G or 5G network, for example.

The connection 13 between the gateway device 2 and the Internet 6 can be implemented using a digital subscriber line (DSL), a coaxial cable connection, a broadband mobile phone network connection, an optical network connection, or other similar connections. The connection 13 can also be implemented using a wireless connection that operates in accordance with, but is not limited to, IEEE 802.11 protocol, a Radio Frequency For Consumer Electronics (RF4CE) protocol, ZigBee protocol, Z-Wave protocol, or IEEE 802.15.4 protocol. It is also contemplated by the present disclosure that connection 13 is capable of providing connections between the gateway device 2 and a WAN, a LAN, a VPN, MANs, PANs, WLANs, SANs, a DOCSIS network, a fiber optics network (such as FTTH, FTTX, or HFC), a PSDN, a global Telex network, or a 2G, 3G, 4G or 5G network, for example.

The gateway device 2 can be, for example, a hardware electronic device that may be a combination modem and gateway device that combines the functions of a modem and a router for providing content received from the content provider 1 to network devices (e.g., wireless extenders 3, client devices 4, and mobile device 5) in the system. It is also contemplated by the present disclosure that the gateway device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

The connection 9 between the gateway device 2, the wireless extenders 3, and client devices 4 can be implemented using a wireless connection in accordance with Bluetooth protocols (e.g., Bluetooth versions 1.0-3.0 and Bluetooth Low Energy (BLE) versions 4.0-5.0) or other short range protocols that operate in accordance with a wireless technology standard for exchanging data over short distances using radio waves in the 2.4 GHz bands, the 5 GHz bands, or the 6 GHz bands, for example.

Additionally, the connection 9 can be implemented using a wireless connection that operates in accordance with, but is not limited to, IEEE 802.11 protocol, RF4CE protocol, ZigBee protocol, Z-Wave protocol, or IEEE 802.15.4 protocol. It is also contemplated by the present disclosure that the connection 9 can include connections to a media over coax (MoCA) network.

The wireless extenders 3 can be, for example, hardware electronic devices that are used to extend the wireless network by receiving the signals transmitted by the gateway device 2 and rebroadcasting the signals to, for example, client devices 4, which may out of range of the gateway device 2. The wireless extenders 3 can also receive signals from the client devices 4 and rebroadcast the signals to the gateway device 2, mobile device 5, or other client devices 4.

The connection 11 between the wireless extenders 3 and the client devices 4 are implemented through a wireless connection that operates in accordance with Bluetooth protocols (e.g., Bluetooth versions 1.0-3.0 and Bluetooth Low Energy (BLE) versions 4.0-5.0) or other short range protocols that operate in accordance with a wireless technology standard for exchanging data over short distances using radio waves in the 2.4 GHz bands, the 5 GHz bands, or the 6 GHz bands, for example. Additionally, the connection 11 can be implemented using a wireless connection that operates in accordance with, but is not limited to, IEEE 802.11 protocol, RF4CE protocol, ZigBee protocol, Z-Wave protocol, or IEEE 802.15.4 protocol.

The client devices 4 can be, for example, hand-held computing devices, personal computers, electronic tablets, smart phones, smart speakers, IoT devices, an iControl devices, or other similar wireless hand-held consumer electronic devices capable of executing and displaying the content received through, for example, the gateway device 2. Additionally, the client device 4 can also be a TV, an IP/QAM STB or an SMD that is capable of decoding audio/video content, and playing over OTT or MSO provided content received through the gateway device 2.

The connection 10 between the gateway device 2 and the mobile device 5 is implemented through a wireless connection that operates in accordance with, but is not limited to, IEEE 802.11 protocol. Additionally, the connection 10 between the gateway device 2 and the mobile device 5 can also be implemented through a WAN, a LAN, a VPN, MANs, PANs, WLANs, SANs, a DOCSIS network, a fiber optics network (such as FTTH, FTTX, or HFC), a PSDN, a global Telex network, or a 2G, 3G, 4G or 5G network, for example. The connection 10 can also be implemented using a wireless connection in accordance with Bluetooth protocols (e.g., Bluetooth versions 1.0-3.0 and Bluetooth Low Energy (BLE) versions 4.0-5.0) or other short range protocols that operate in accordance with a wireless technology standard for exchanging data over short distances using radio waves in the 2.4 GHz bands, the 5 GHz bands, or the 6 GHz bands, for example.

The mobile device 5 can be, for example, a hand-held computing device, a personal computer, a smartphone, an electronic tablet, an e-reader, a personal digital assistant (PDA), or a portable music player with smart capabilities that is capable of connecting to the Internet, cellular networks, and interconnecting with other devices via Wi-Fi and Bluetooth protocols.

Figure 2:
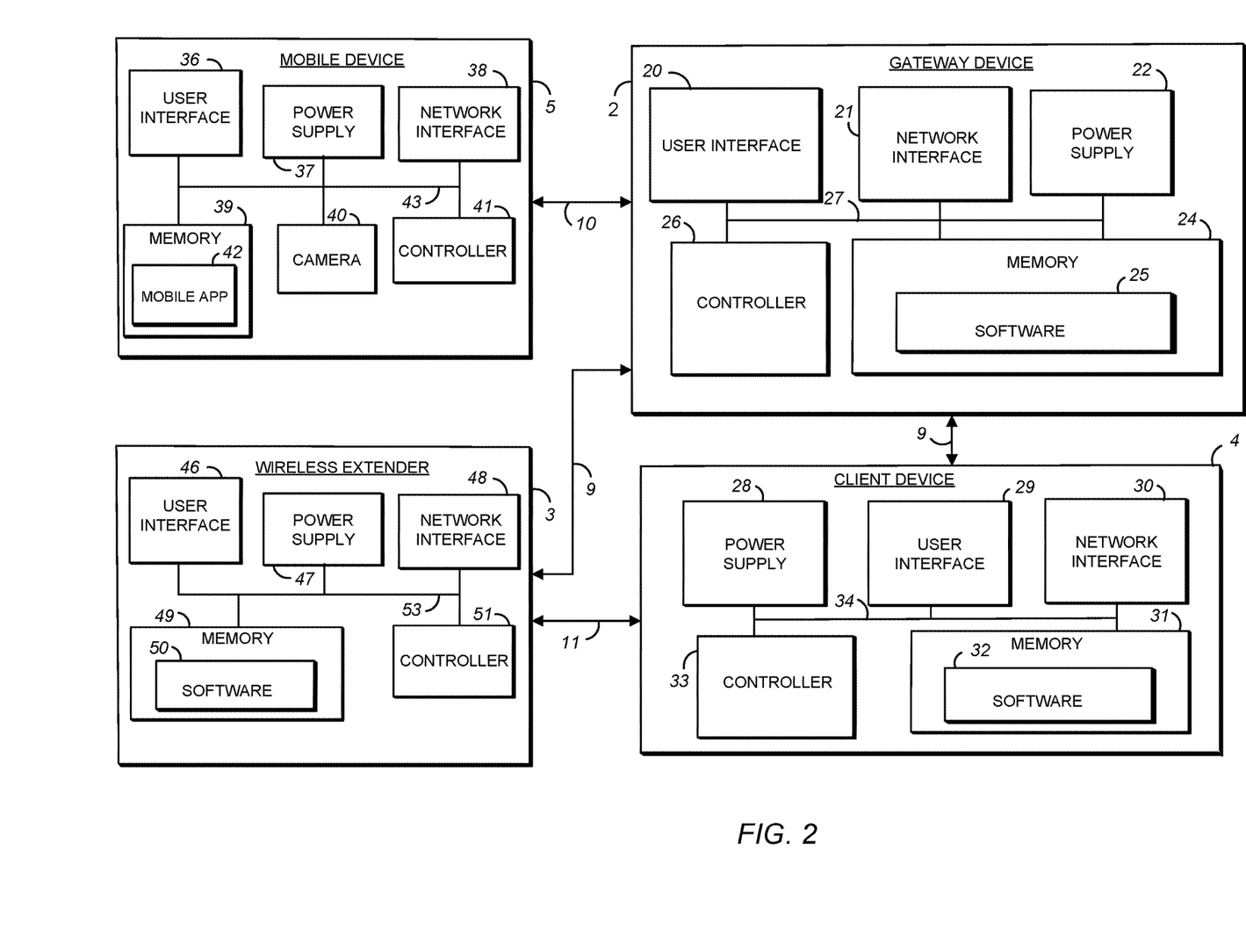
FIG. 2 is a more detailed schematic diagram of an exemplary gateway device, client device, wireless extender, and mobile device implemented in the system of FIG. 1 according to an embodiment of the present disclosure.

A detailed description of the exemplary internal components of the gateway device 2, wireless extenders 3, client devices 4, and mobile device 5 shown in FIG. 1 will be provided in the discussion of FIG. 2. However, in general, it is contemplated by the present disclosure that the gateway device 2, wireless extenders 3, client devices 4, and mobile device 5 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing components in the gateway device 2, wireless extenders 3, client devices 4, and mobile device 5 may be adapted to execute any operating system, including Linux, UNIX, Windows, MacOS, DOS, and ChromOS as well as virtual machines adapted to virtualize execution of a particular operating system, including customized and proprietary operating systems. The gateway device 2, wireless extenders 3, client devices 4, and mobile device 5 are further equipped with components to facilitate communication with other computing devices over the one or more network connections to local and wide area networks, wireless and wired networks, public and private networks, and any other communication network enabling communication in the system.

FIG. 2 is a more detailed schematic diagram of an exemplary gateway device 2, an exemplary wireless extender 3, an exemplary client device 4, and an exemplary mobile device 5 implemented in the system of FIG. 1 according to an embodiment of the present disclosure. Although FIG. 2 only shows one wireless extender 3 and one client device 4, the wireless extender 3 and the client device 4 shown in the figure are meant to be representative of the other wireless extenders 3 and client devices 4 shown in FIG. 1. Similarly, the connections 9, 10, 11 between the gateway devices 2, wireless extenders 3, client devices 4, and mobile devices 5 shown in FIG. 2 are meant to be exemplary connections and are not meant to indicate all possible connections between the gateway devices 2, wireless extenders 3, client devices 4, and mobile devices 5 in FIG. 1. Additionally, it is contemplated by the present disclosure that the number of gateway devices 2, wireless extenders 3, client devices 4, and mobile devices 5 is not limited to the number of gateway devices 2, wireless extenders 3, client devices 4, and mobile devices 5 shown in FIGS. 1 and 2.

Now referring to FIG. 2 (e.g., from left to right), the mobile device 5 can be, for example, any handheld computer, smartphone, electronic tablet, e-reader, personal digital assistant (PDA), or portable music player with smart capabilities that is capable of connecting to the Internet, cellular networks, and interconnecting with other devices via Wi-Fi and Bluetooth. As shown in FIG. 2, the mobile device 5 includes a user interface 36, a power supply 37, a network interface 38, a memory 39, a camera 40, and a controller 41. The user interface 36 can include, but is not limited to, push buttons, a keyboard, a keypad, a liquid crystal display (LCD), a cathode ray tube (CRT), a thin film transistor (TFT), a light-emitting diode (LED), a high definition (HD) or other similar display device including a display device having touch screen capabilities so as to allow interaction between a user and the mobile device 5.

The power supply 37 provides power to the internal components of the mobile device 5 through the internal bus 43. The power supply 37 can include a self-contained power source such as a battery pack with an interface to be powered through an electrical charger connected to an outlet (e.g., either directly or by way of another device). The power supply 37 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The network interface 38 can include various network cards, interfaces, and circuitry implemented in software and/or hardware to enable communications with the gateway device 2 using connection 10. The various network cards, interfaces, and circuitry of network interface 38 enable communications via connection 10 using a wireless connection that operates in accordance with, but is not limited to, IEEE 802.11 protocol. The various network cards, interfaces, and circuitry of network interface 38 also enable communications via connection 10 using a wireless connection that operates in accordance with Bluetooth protocols (e.g., Bluetooth versions 1.0-3.0 and Bluetooth Low Energy (BLE) versions 4.0-5.0) or other short range protocols that operate in accordance with a wireless technology standard for exchanging data over short distances using radio waves in the 2.4 GHz bands, the 5 GHz bands, or the 6 GHz bands, for example. Additionally, the various network cards, interfaces, and circuitry of network interface 38 enable communications via connection 10 using a wireless connection that operates through the Internet, a computer network, a WAN, a LAN, a VPN, MANs, PANs, WLANs, SANs, a DOCSIS network, a fiber optics network (such as FTTH, FTTX, or HFC), a PSDN, a global Telex network, or a 2G, 3G, 4G or 5G network, for example.

The memory 39 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy.

The memory 39 can be used to store any type of instructions including a mobile application 42 associated with algorithms, processes, or operations for controlling the general functions and operations of the mobile device 5 in accordance with the embodiments described in the present disclosure. The camera 40 can be a standard camera of a camera phone that is able to capture photographs and record video.

The controller 41 controls the general operations of the mobile device 5 and can include, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the mobile device 5. General communication between the components (e.g., 36-41) of the mobile device 5 is performed using the internal bus 43.

The wireless extender 3 can be, for example, a hardware electronic device that is used to extend a wireless network by receiving the signals transmitted by the gateway device 2 and rebroadcasting the signals to client devices 4, which may be out of range of the gateway device 2. The wireless extender 3 can also receive signals from the client devices 4 and rebroadcast the signals to the gateway device 2, mobile device 5, or other client devices 4.

As shown in FIG. 2, the wireless extender 3 includes a user interface 46, a power supply 47, a network interface 48, a memory 49, and a controller 51. The user interface 46 can include, but is not limited to, push buttons, a keyboard, a keypad, an LCD, a CRT, a TFT, an LED, an HD or other similar display device including a display device having touch screen capabilities so as to allow interaction between a user and the wireless extender 3. The power supply 47 supplies power to the internal components of the wireless extender 3 through the internal bus 53. The power supply 47 can include a self-contained power source such as a battery pack with an interface to be powered through an electrical charger connected to an outlet (e.g., either directly or by way of another device). The power supply 47 can also include a rechargeable battery that can be detached allowing for replacement such as a NiCd, a NiMH, a Li-ion, or a Li-pol battery.

The network interface 48 can include various network cards, interfaces, and circuitry implemented in software and/or hardware to enable communications with the client device 4 using connection 11 and with the gateway device 9 using connection 9. The various network cards, interfaces, and circuitry of the network interface 48 enable communications via connection 11 using a wireless protocol in accordance with Bluetooth protocols (e.g., Bluetooth versions 1.0-3.0 and Bluetooth Low Energy (BLE) versions 4.0-5.0) or other short range protocols that operate in accordance with a wireless technology standard for exchanging data over short distances using radio waves in the 2.4 GHz bands, the 5 GHz bands, or the 6 GHz bands, for example. Additionally, the various network cards, interfaces, and circuitry of the network interface 48 enable communications via connection 11 using a wireless connection in accordance with, but is not limited to, IEEE 802.11 protocol, RF4CE protocol, ZigBee protocol, Z-Wave protocol, or IEEE 802.15.4 protocol.

The various network cards, interfaces, and circuitry of the network interface 48 enable communications via connection 9 using a wireless protocol in accordance with, but is not limited to, Bluetooth protocols (e.g., Bluetooth versions 1.0-3.0 and Bluetooth Low Energy (BLE) versions 4.0-5.0) or other short range protocols that operate in accordance with a wireless technology standard for exchanging data over short distances using radio waves in the 2.4 GHz bands, the 5 GHz bands, or the 6 GHz bands, for example. Additionally, the various network cards, interfaces, and circuitry of the network interface 48 enable communications via connection 9 using a wireless connection that operates in accordance with, but is not limited to, IEEE 802.11 protocol, RF4CE protocol, ZigBee protocol, Z-Wave protocol, or IEEE 802.15.4 protocol.

The memory 49 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy.

The memory 49 can be used to store any type of instructions, software, or algorithm including software 50 associated for controlling the general functions and operations of the wireless extender 3 in accordance with the embodiments described in the present disclosure (e.g., including optimized data collection according to the embodiments of the present disclosure).

The controller 51 controls the general operations of the wireless extender 3 and can include, but is not limited to, a CPU, a hardware microprocessor, a hardware processor, a multi-core processor, a single core processor, an FPGA, a microcontroller, an ASIC, a DSP, or other similar processing device capable of executing any type of instructions, algorithms, or software for controlling the operation and functions of the wireless extender 3. General communication between the components (e.g., 46-49 and 51) of the wireless extender 3 is performed using the internal bus 53.

The gateway device 2 can be, for example, a hardware electronic device that can combine the functions of a modem and a router for providing content received from the content provider 1 to network devices (e.g., wireless extenders 3, client devices 4, and mobile device 5) in the system. It is also contemplated by the present disclosure that the gateway device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

As shown in FIG. 2, the gateway device 2 includes a user interface 20, a network interface 21, a power supply 22, a memory 24, and a controller 26. The user interface 20 can include, but is not limited to, push buttons, a keyboard, a keypad, an LCD, a CRT, a TFT, an LED, an HD or other similar display device including a display device having touch screen capabilities so as to allow interaction between a user and the gateway device 2. The network interface 21 may include various network cards, and circuitry implemented in software and/or hardware to enable communications with the wireless extender 3 and client device 4 using connection 9 and with the mobile device 5 using connection 10.

The various network cards, interfaces, and circuitry of the network interface 21 enable communications via connection 9 using a wireless protocol that operates in accordance with, but is not limited to, Bluetooth protocols (e.g., Bluetooth versions 1.0-3.0 and Bluetooth Low Energy (BLE) versions 4.0-5.0) or other short range protocols that operate in accordance with a wireless technology standard for exchanging data over short distances using radio waves in the 2.4 GHz bands, the 5 GHz bands, or the 6 GHz bands, for example. Additionally, the various network cards, interfaces, and circuitry of network interface 21 enable communications via connection 9 using a wireless protocol that operates in accordance with, but is not limited to, IEEE 802.11 protocol, RF4CE protocol, ZigBee protocol, Z-Wave protocol, or IEEE 802.15.4 protocol.

The various network cards, interfaces, and circuitry of the network interface 21 enable communications via connection 10 using a wireless protocol that operates in accordance with, but is not limited to, IEEE 802.11 protocol. The various network cards, interfaces, and circuitry of the network interface 21 also enable communications via connection 10 using a wireless connection that operates through the Internet, a computer network, a WAN, a LAN, a VPN, MANs, PANs, WLANs, SANs, a DOCSIS network, a fiber optics network (such as FTTH, FTTX, or HFC), a PSDN, a global Telex network, or a 2G, 3G, 4G or 5G network, for example.

The power supply 22 supplies power to the internal components of the gateway device 2 through the internal bus 27. The power supply 22 can be a self-contained power source such as a battery pack with an interface to be powered through an electrical charger connected to an outlet (e.g., either directly or by way of another device). The power supply 22 can also include a rechargeable battery that can be detached allowing for replacement such as a NiCd, a NiMH, a Li-ion, or a Li-pol battery.

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be used to store any type of instructions, software, or algorithm including software 25 for controlling the general functions and operations of the gateway device 2 in accordance with the embodiments described in the present disclosure (e.g., including optimized data collection according to the embodiments of the present disclosure).

The controller 26 controls the general operations of the gateway device 2 and includes, but is not limited to, a CPU, a hardware microprocessor, a hardware processor, a multi-core processor, a single core processor, a FPGA, a microcontroller, an ASIC, a DSP, or other similar processing device capable of executing any type of instructions, algorithms, or software for controlling the operation and functions of the gateway device 2. Communication between the components (e.g., 20-22, 24, and 26) of the gateway device 2 is established using the internal bus 27.

The client device 4 can be, for example, a computer, a portable device, an electronic tablet, a smart phone, a smart speaker, IoT device, iControl device, or other wireless hand-held consumer electronic device capable to executing and displaying the content received through the gateway device 2. Additionally, the client device 4 can also be a TV, an IP/QAM STB, or an SMD that is capable of decoding audio/video content, and playing over OTT or MSO provided content received through the gateway device 2.

As shown in FIG. 2, the client device 4 includes a power supply 28, user interface 29, network interface 30, a memory 31, and a controller 33. The power supply 28 supplies power to the internal components of the client device 4 through the internal bus 34. The power supply 28 can be a self-contained power source such as a battery pack with an interface to be powered through an electrical charger connected to an outlet (e.g., either directly or by way of another device).

The power supply 28 can also include a rechargeable battery that can be detached allowing for replacement such as a NiCd, a NiMH, a Li-ion, or a Li-pol battery. The user interface 29 includes, but is not limited to, push buttons, a keyboard, a keypad, an LCD, a CRT, a TFT, an LED, an HD or other similar display device including a display device having touch screen capabilities so as to allow interaction between a user and the client device 4.

The network interface 30 may include various network cards, interfaces, and circuitry implemented in software and/or hardware to enable communications with the gateway device 2 via connection 9 and with the wireless extender 3 via connection 11. The various network cards, interfaces, and circuitry of the network interface 30 enable communications via connection 9 using a wireless protocol that operates in accordance with, but is not limited to, Bluetooth protocols (e.g., Bluetooth versions 1.0-3.0 and Bluetooth Low Energy (BLE) versions 4.0-5.0) or other short range protocols that operate in accordance with a wireless technology standard for exchanging data over short distances using radio waves in the 2.4 GHz bands, the 5 GHz bands, or the 6 GHz bands, for example. Additionally, the various network cards, interfaces, and circuitry of network interface 30 enable communications via connection 9 using a wireless protocol that operates in accordance with, but is not limited to, IEEE 802.11 protocol, RF4CE protocol, ZigBee protocol, Z-Wave protocol, or IEEE 802.15.4 protocol.

The various network cards, interfaces, and circuitry of the network interface 30 enable communications via connection 11 using a wireless protocol that operates in accordance with, but is not limited to, Bluetooth protocols (e.g., Bluetooth versions 1.0-3.0 and Bluetooth Low Energy (BLE) versions 4.0-5.0) or other short range protocols that operate in accordance with a wireless technology standard for exchanging data over short distances using radio waves in the 2.4 GHz bands, the 5 GHz bands, or the 6 GHz bands, for example. Additionally, the various network cards, interfaces, and circuitry of the network interface 30 enable communications via connection 11 using a wireless connection that operates in accordance with, but is not limited to, IEEE 802.11 protocol, RF4CE protocol, ZigBee protocol, Z-Wave protocol, or IEEE 802.15.4 protocol.

The memory 31 includes a single memory or one or more memories or memory locations that include, but are not limited to a RAM, a DRAM, a memory buffer, a hard drive, a database, an EPROM, an EEPROM, a ROM, a flash memory, logic blocks of a FPGA, hard disk or any other various layers of memory hierarchy. The memory 31 can be used to store any type of instructions, software, or algorithms for controlling the general function and operations of the client device 4 in accordance with the embodiments described in the present disclosure (e.g., including monitoring and installation enhancements according to the embodiments of the present disclosure).

The controller 33 controls the general operations of the client device 4 and includes, but is not limited to, but is not limited to, a CPU, a hardware microprocessor, a hardware processor, a multi-core processor, a single core processor, a FPGA, a microcontroller, an ASIC, a DSP, or other similar processing device capable of executing any type of instructions, algorithms, or software for controlling the operation and functions of the client device 4. Communication between the components (e.g., 28-31 and 33) of the client device 4 is established using an internal bus 34.

Figure 3:
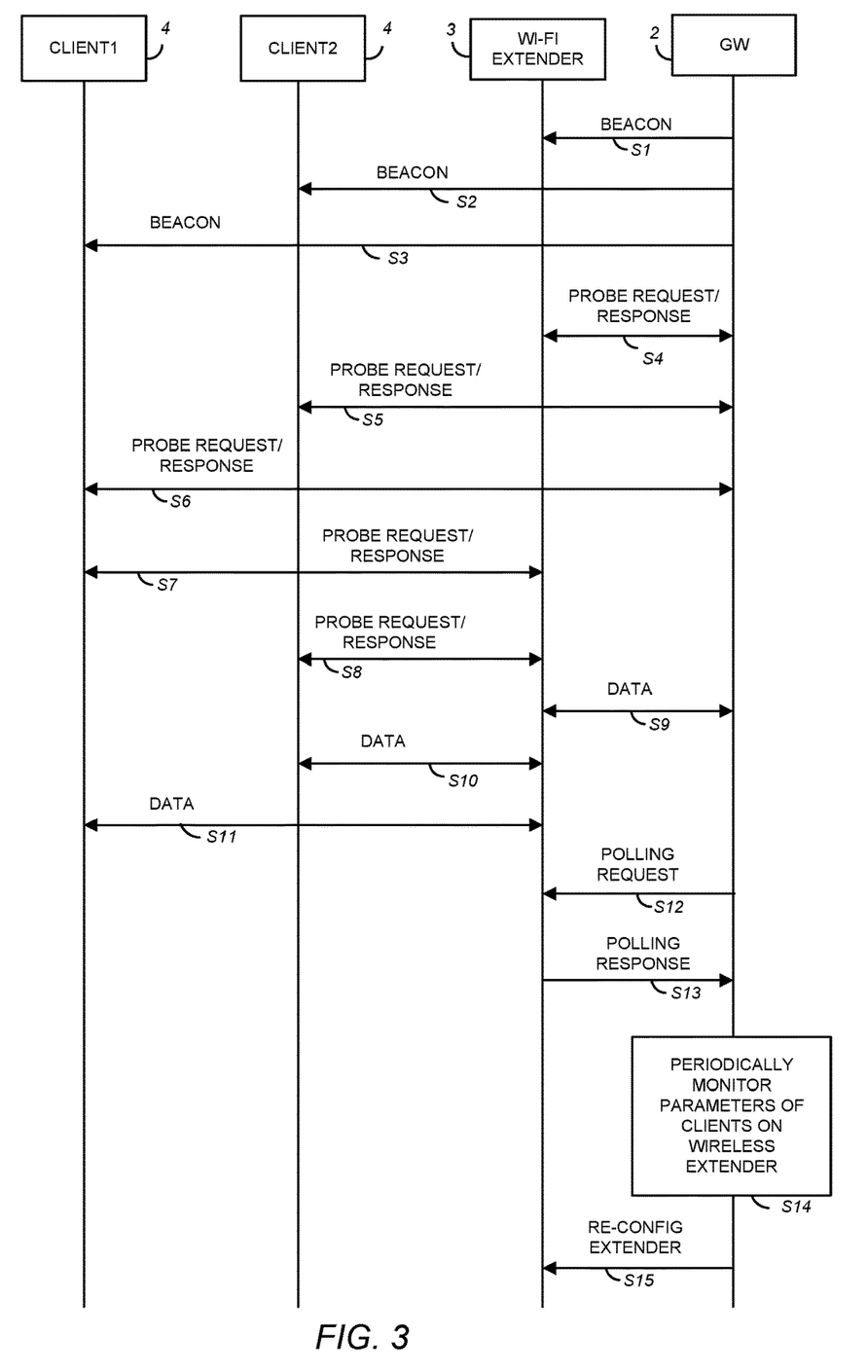
FIG. 3 illustrates a method and algorithm for performing optimized data collection for a wireless device according to an embodiment of the present disclosure.

FIG. 3 illustrates a method and algorithm for performing optimized data collection for a wireless device according to an embodiment of the present disclosure. In FIG. 3, it is assumed that client1 (e.g., client device 4), client2 (e.g., client device 4), Wi-Fi extender (e.g., wireless extender 3), and the gateway device 2 include their respective software 25, 32, 50 stored in their respective memories 24, 31, 49, which when executed by their respective controllers 26, 33, 51 perform the functions and operations in accordance with the embodiments described in the present disclosure (e.g., including optimized data collection according to the embodiments of the present disclosure).

Although FIG. 3 shows one gateway device 2, two client devices 4 (e.g., client1 and client2), and one wireless extender 3 (e.g., Wi-Fi extender1), it is contemplated by the present disclosure that the method and algorithm can be applied to any number of gateway devices 2, client devices 4, and wireless extenders 3 for providing optimized data collection for any number of wireless networks in the system of FIG. 1.

In steps S1-S3, the gateway device 2 transmits beacon signals to the Wi-Fi extender (e.g., wireless extender 3), client1 (e.g., client device 4) and client2 (e.g., client device 4) using the network interface 21 and the respective wireless connections 9.

The beacon signals are initially used to announce the existence of the one or more networks, but can be transmitted at regular or periodic intervals as part of a network monitoring and management function for the one or more networks in the system. As mentioned, the beacon signals can be transmitted at regular or periodic intervals and allow client1 (e.g., client device 4), client2 (e.g., client device 4), Wi-Fi extender (e.g., wireless extender 3) to find and identify one or more networks in the system and for the exchange of device and network parameters as well as other data between the devices.

It is contemplated by the present disclosure that the beacon signals include beacon frames with parameters such as, but not limited to, timestamps, beacon intervals, capability information, service set identifiers (SSIDs), supported data rates, frequency-hopping (FH) parameter sets, direct-sequence (DS) parameter sets, contention-free (CF) parameter sets, independent basic service set identifiers (IBSSs), traffic indication maps (TIMs) and other parameters related to devices and networks in the system. The client1 (e.g., client device 4) and client2 (e.g., client device 4), and Wi-Fi extender (e.g., wireless extender 3) generally scan all channels in the system searching for beacons announcing the presence of a nearby access point such as the gateway device 2, available networks, and parameters related to other devices and the networks.

In step S4, the Wi-Fi extender (wireless extender 3) transmits a probe request using its network interface 48 and wireless connection 9 to the gateway device 2. The gateway device 2 receives the probe request via its network interface 21 and wireless connection 9 and responds by transmitting a probe response back to the Wi-Fi extender (wireless extenders 3) using again its network interface 21 and wireless connection 9. The probe request from the Wi-Fi extender (e.g., wireless extender 3) includes a probe request frame with parameters such as, but not limited to, SSIDs and the data rates supported, BSSID, capability information, power level information, association reports, non-association reports, channel usage, dwell times, reason codes, and other similar device and network parameters.

It is contemplated by the present disclosure that the exchange of probe signals between the Wi-Fi extender (wireless extenders 3) and the gateway device 2 can be at regular or periodic intervals as part of a network monitoring and management function for the one or more networks in the system of FIG. 1. Thus, the probe request from the Wi-Fi extender (e.g., wireless extender 3) can also include any device and network parameters obtain from the exchange of probe signals with client1 (e.g., client device 4) and client2 (e.g., client device 4). The exchange of probe signals between the Wi-Fi extender (wireless extenders 3) and the gateway device 2 enables the exchange of device and network parameters related to the Wi-Fi extender (e.g., wireless extender 3), client1 (e.g., client device 4) and client2 (e.g., client device 4).

In steps S5 and S6, client1 and client2 (e.g., client devices 4), and the gateway device 2 exchange probe signals. That is, client1 and client2 (e.g., client devices 4) receives the beacon signal (in steps S2 and S3) using their respective network interfaces 30 and wireless connections 9 and obtain the beacon frame parameters regarding the capabilities and configuration of the one or more networks. In steps S5 and S6, client1 and client2 (e.g., client device 4) then transmits a probe request using again their respective network interfaces 30 and wireless connections 9 back to the gateway device 2. The gateway device 2 receives the probe request via its network interface 21 and wireless connection 9 and responds by transmitting probe responses back to client1 and client2 (e.g., client device 4) using again its network interface 21 and wireless connection 9.

It is contemplated by the present disclosure that the probe requests include probe request frames with parameters such as, but not limited to, SSIDs and the rates supported by client1, BSSID, capability information, power level information, association reports, non-association reports, channel usage, dwell times, reason codes, and other similar device and network parameters. The probe response from the gateway device 2 includes a probe response frame with parameters that are similar to the parameters in the beacon frame and include, but not limited to, timestamps, beacon intervals, capability information, SSIDs, supported data rates, FH parameter sets, DS parameter sets, CF parameter sets, IBSS, TIM, and other similar device and network parameters. The probe response frame carries all the parameters in a beacon frame, which enables client1 and client2 (e.g., client device 4) to obtain device and network parameters, match parameters, and join one or more networks in the system.

The client1 and client2 (e.g., client device 4) must support all the data rates required by a network and must want to join a network identified by an SSID, which may be set to a specific network or set to join any compatible network. It is contemplated by the present disclosure that the exchange of probe signals between the gateway 2 and client1 and client2 (e.g., client device 4) in steps S5 and S6 can be performed at regular or periodic intervals as part of a network monitoring and management function for the one or more networks in the system of FIG. 1.

In steps S7 and S8, client1 and client2 (e.g., client device 4) also send probe requests to the Wi-Fi extender (e.g., wireless extender 3) using their respective network interfaces 30 and connections 9. The Wi-Fi extender (e.g., wireless extender 3) receives the probe requests using its network interface 48 and wireless connection 9 and obtains the probe request frame parameters. The Wi-Fi extender (e.g., wireless extender 3) transmits a probe response back to the client1 and client 2 using again its network interface 48 and wireless connection 9.

It is contemplated by the present disclosure that the probe request from the client1 and client2 (e.g., client device 4) and the probe response from the Wi-Fi extender (wireless extenders 3) include similar probe frames with parameters as in steps S5 and S6 such as, but not limited to, SSIDs and the rates supported by client1, BSSID, capability information, power level information, association reports, non-association reports, channel usage, dwell times, reason codes, and other similar device and network parameters. The probe signal exchange between the client1 and client2 (e.g., client device 4) and Wi-Fi extender (wireless extenders 3) enables the exchange of device and network parameters between the devices.

It is also contemplated by the present disclosure that the exchange of probe signals between the client1 and client2 (e.g., client device 4) and Wi-Fi extender (wireless extenders 3) in steps S7 and S8 can be performed at regular or periodic intervals as part of a network monitoring and management function for the one or more networks in the system of FIG. 1.

Steps S9-S11 represent the data exchange between the gateway device 2 and the Wi-Fi extender 3 as well as the data exchange between the Wi-Fi extender 3 and client1 and client2. For example, once client1 and client2 successfully join one or more networks in the system of FIG. 1, client1 and client2 can receive various types of data and content via gateway device 2 and the wireless extender 3 received from, for example, a content provider 1 using their respective network interface 30 and wireless connections 9, 11.

In step S12, the gateway device 2 periodically sends a polling request to the Wi-Fi extender 3 using its network interface 21 and wireless connection 9. The polling request allows the gateway device 2 to obtain the network topology at periodic intervals from the Wi-Fi extender 3. The topology information contains information regarding the wireless extender 3 and the client devices 4 (e.g., client1 and client 2) connected to the wireless extender 3. The gateway device 2 also uses the polling request to periodically collect station metrics data or station link metrics from wireless extender 2. Alternatively, the gateway device 2 can configure the wireless extender 3 to report station metrics data or station link metrics periodically.

In step S13, the wireless extender 3 transmits a polling response back to the gateway device 2 using its network interface 48 and connection 9. The polling response includes station metrics data, which is parameter data related to the different client devices 4 in communication with or connected to the wireless extender 3. The station metrics data is included in the polling response and includes, but is not limited to, a received signal strength indicator (RSSI), a non-associated (NA)-RSSI, a NA station list, an Uplink rate (BytesTx), TrafficLevel (BytesRx), and a steer count for the different client devices 4 in communication with or connected to the wireless extender 3. It is contemplated by the present disclosure that the wireless extender 3 collects the parameter data or station metrics data of the client devices 4 and reports it to gateway device 2 per a predetermined or configured policy interval or by the gateway device 2 requesting the parameter data or station metrics data using the polling request.

In step S14, the gateway device 2 periodically monitors the parameter data included in the station metrics data for the client devices 4 communication with or connected to the wireless extender 3. For example, the controller 26 executes one or more programs 25 stored in the memory 24 of the gateway device 2 for monitoring parameter data included in the station metrics data.

The gateway devices monitors, for example, the rate of change of RSSI, the rate of change for the NA-RSSI with respect to the NA station list, the UplinkRate, TrafficLevel, and the steer count. The gateway device 2 determines if the client devices 4 (e.g., client1 and client2) are mobile or immobile devices. The immobile devices can include, but is not limited to, TVs, STBs, SMDs, and a wide range of IoT devices. The details of the different conditions monitored with respect to the station metrics data for determining if the client devices 4 (e.g., client1 and client2) are mobile or immobile devices will be discussed in more detail with reference to FIG. 4.

Once a client device 4 (e.g., client 1 or client2) is classified as an immobile device, the gateway device 2 will transmit an instruction, command, or policy change to reconfigure the wireless extender 3 so as to reduce the parameter collection/reporting for any client device 4 determined to be an immobile device (e.g., client1 or client2) in step S15 (e.g., reducing the amount of parameter data collected for an immobile client device over certain period of time and/or reducing the number of reports provided for an immobile client device over a certain time period). Additionally, if a client device 4 (e.g., client 1 or client2) is classified as a mobile device, the gateway device 2 can transmit an instruction, command, or policy change to reconfigure the wireless to increase the data collection and/or reporting for the mobile device.

Some Wi-Fi devices in a network are not mobile devices or are considered immobile devices (e.g., TVs, STBs, SMDs, and a wide range of IoT devices). The immobile devices are included with the typical station parameter collection by the wireless extenders (e.g., such that all the station parameter data event handling is performed by the wireless extenders). Additionally, typical station parameter collection by the wireless extenders can result in timely and required reporting operations by the wireless extenders.

Thus, the immobile devices in the wireless network can negatively influence roaming/steering operations and unnecessarily overload the wireless extenders and a MAP control device because the immobile devices rarely require roaming/steering operations. Overloading on the wireless extenders and the MAP control device can cause important wireless devices (e.g., requiring roaming and steering operations) to receive delayed roaming and steering operations, thereby affecting QoE.

The aspects and embodiments of the present disclosure provide optimized data collection in a wireless network by automatically reducing the burden on wireless extenders, backhaul and control devices caused by immobile devices, such that overall system performance and QoE in the wireless network is improved.

Figure 4:
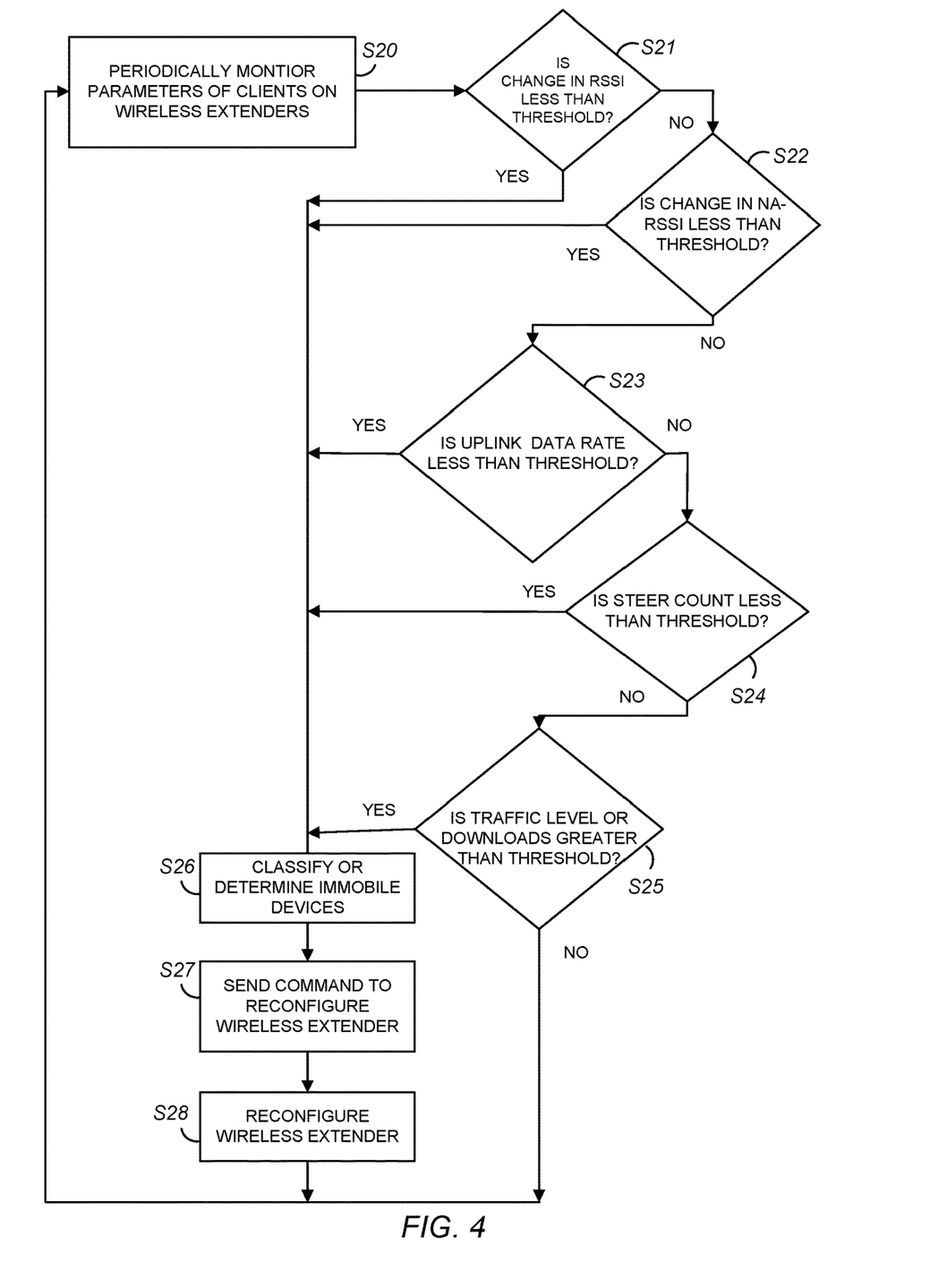
FIG. 4 illustrates a method and algorithm for performing for a method and algorithm for performing optimized data collection for a wireless device according to an embodiment of the present disclosure.

FIG. 4 illustrates a method and algorithm for performing optimized data collection for a wireless device according to an embodiment of the present disclosure. The exemplary method and algorithm of FIG. 4 illustrates the different conditions monitored by the gateway device 2 using the parameter data included in the station metrics data for the client devices 4 in communication with or connected to the wireless extender 3, as described in FIG. 3.

In step S20, the controller 26 of the gateway device 2 executes one or more programs 25 stored in the memory 24 of the gateway device 2 for monitoring parameter data included in the station metrics data and performing an optimized data collection function. The gateway device 2 monitors, for example, the RSSI, the NA-RSSI and NA station list, UplinkRate, TrafficLevel, and steer count included in the station metrics data. Although the gateway device 2 is described in FIG. 4 as monitoring RSSI, the NA-RSSI and NA station list, UplinkRate, TrafficLevel, and steer count, it is contemplated by the present disclosure that the gateway device 2 can monitor other parameter data related to the client devices in communication with or connected to the wireless extender 3.

In step S21, the gateway device 2 evaluates the RSSI included in the station metrics data received in the polling response. The RSSI can be initially calculated by the wireless extender 3 by using the controller 51 executing one or more programs (e.g., software 50) in the memory 49 based on probe requests received from the client devices 4. The RSSI is an indication of signal strength (e.g., in decibels (dB)) of the client device 4 transmitting the probe request to the wireless extender 3. The wireless extender 3 can calculate the RSSI for the client devices 4 and include the RSSI in the polling response to the gateway device 2. The RSSI values can fluctuate, therefore, average RSSI values can be calculated by the wireless extender 3 and used for determining the signal strengths. Additionally, other criteria can be implemented such as calculating the median or normal distribution of the RSSI values.

In step S21, the gateway device 2 determines if the rate of change of the RSSI is below a predetermined threshold (e.g., decibels (dB)/time) stored in the memory 24. The threshold can be set to, for example, 5 dB/minute or less. It is contemplated by the present disclosure that the rate of change of the RSSI (e.g., dB/time) used as the threshold can vary depending on the devices and network being monitored by the gateway device 2. In step S21, if it is determined that the rate of change of the RSSI is below the threshold, then the client device 4 associated with the RSSI is classified as an immobile device in step S26. That is, if the rate of change of RSSI is low or small then the client device 4 is considered to be approximately stationary or immobile such as a TV, STB, SMD, or IoT device. When a client device 4 is classified as an immobile device in step S26, the controller 26 of the gateway device 2 transmits an instruction or command to the wireless extender 3 using the network interface 20 and connection 9 to re-configure or change the policies of wireless extender 3 in step S27.

In step S28, the wireless extender 3 receives the instruction or command, and the controller 51 executes one or more programs (e.g., software 50) in the memory 49 to reconfigure, modify, or change the policies of the wireless extender 3 with regard to the data collection and/or reporting with respect to the client device 4 determined to be an immobile device. The need for data collection and/or reporting is less for immobile devices (e.g., TVs, STBs, or IoT devices) because immobile devices do not require frequent roaming/steering operations. Therefore, the wireless extender 3 is re-configured such that there is less parameter data collection and/or reporting for client devices 4 determined to be immobile (e.g., reducing the amount of parameter data collected for an immobile client device over certain period of time and/or reducing the number of reports provided for an immobile client device over a certain time period). After step S28, the gateway device 2 will continue to periodically monitor the parameter data in the station metrics data, as in step S20.

In step S21, if the gateway device 2 determines that the rate of change of the RSSI for a client device 4 is not below the threshold, then the gateway device 2 will monitor the next or more parameter data included in the station metrics data such as the NA-RSSI and the NA station list. In step S22, the gateway device 2 evaluates the NA-RSSI and the NA station list to determine if the rate of change of the NA-RSSI of the client device 4 on the NA station list (e.g., station list of client devices on other wireless extenders 3) is below a predetermined threshold (e.g., dB/time) stored in the memory 24. Similar to RSSI, the NA-RSSI can be initially calculated by a wireless extender 3 by using the controller 51 executing one or more programs (e.g., software 50) in the memory 49 based on probe requests received from the client devices 4. The wireless extender 3 can calculate the NA-RSSI for the client devices 4 and include the NA-RSSI in the polling response to the gateway device 2. The threshold stored in the gateway device can be set to, for example, 5 dB/minute or less. It is contemplated by the present disclosure that the rate of change of the RSSI (e.g., dB/time) used as the threshold can vary depending on the devices and network being monitored by the gateway device 2. In step S22, if the rate of change of the NA-RSSI on the NA station list is below the threshold (e.g., NA-RSSI is very low or almost constant), then the client device 4 is determined or classified to be approximately stationary or an immobile device such as a TV, STB, SMD, or IoT device in step S26.

When a client device 4 is classified as an immobile device in step S26, the controller 26 of the gateway device 2 transmits an instruction or command to the wireless extender 3 using the network interface 20 and connection 9 to re-configure or change the policies of wireless extender 3 in step S27. In step S28, the controller 51 of the wireless extender 3 executes one or more programs (e.g., software 50) in the memory 49 to reconfigure, modify, or change the policies of the wireless extender 3 with regard to the collection data and/or reporting for the client device 4 determined to be an immobile device. The wireless extender 3 is re-configured or the data collection policies of the wireless extender 3 are changed so that there is less parameter data collection and/or reporting for client devices 4 determined to be immobile. After step S28, the gateway device 2 will continue to periodically monitor the parameter data in the station metrics data, as in step S20.

However, in step S22, if the gateway device 2 determines that the rate of change of the NA-RSSI for a client device 4 on the NA station list is not below a threshold, then the gateway device 2 will monitor the next or more parameter data included in the station metrics data such as the UplinkRate or BytesTx (e.g., physical data transmit rate) from the wireless extender 3 with respect to a client device 4. In step S23, the controller 26 of the gateway device 2 will compare the UplinkRate or BytesTx in the station metrics data to a predetermined threshold (e.g., bytes/time) stored in the memory 24. The UplinkRate or BytesTx can be computed daily or hourly by the wireless extender 3 based on the data transmitted to the client device 4 (e.g., steps S9-S11) and included with the station metrics data in the polling response. The threshold can be set to, for example, 1 Kbytes/hour or less. However, it is contemplated by the present disclosure that the Uplink rate or BytesTx (bytes/time) used as the threshold can vary depending on the devices and network being monitored by the gateway device 2. However, a low data UplinkRate and/or BytesTx transmitted is an indication that the client device 4 is not that active or could be a stationary device such as an IoT device (e.g., sensor, etc.).

In step S23, if the gateway device 2 determines that the UplinkRate or BytesTx (bytes/time) is below the threshold, then the client device 4 is classified as an immobile device in step S26. After the controller 26 of the gateway device 2 classifies the client device 4 as an immobile device, the controller 26 of the gateway device 2 transmits an instruction or command to the wireless extender 3 using the network interface 20 and connection 9 to re-configure or change the policies related to data collection and/or reporting of wireless extender 3 in step S27. In step S28, the wireless extender 3 receives the instruction or command transmitted from the gateway device 2 using the network interface 48 and connection 9.

In step S28, the controller 51 of the wireless extender 3 executes one or more programs (e.g., software 50) in the memory 49 to reconfigure, modify, or change the policies of the wireless extender 3 with regard to the collection data and/or reporting for the client device 4 determined to be an immobile device. The wireless extender 3 is re-configured or the data collection policies of the wireless extender 3 are changed so that there is less parameter data collection and/or reporting for client devices 4 determined to be immobile. After step S28, the gateway device 2 will continue to periodically monitor the parameter data in the station metrics data, as in step S20.

In step S23, if the gateway device 2 determines that the UplinkRate or BytesTx (bytes/time) is not below the threshold, then the gateway device 2 will monitor the next or more parameter data included in the station metrics data such as a steer count (e.g., 1, 2, or 3 over one or more days) in step S24. In step S24, the steer count in the station metrics data is compared to a steer count stored in the memory 24 of the gateway device 2 (e.g., 1 or 2). A client device 4 rarely or never steered (e.g., computed across one or more days) from the wireless extender 3 can imply a stationery client device 4.

In step S24, if the gateway device 2 determines that the steer count is below the threshold, then the gateway device 2 will classify the client device 4 as an immobile device in step S26. In step S27, the controller 26 of the gateway device 2 transmits an instruction or command to the wireless extender 3 using the network interface 20 and connection 9 to re-configure or change the policies of wireless extender 3. In step S28, the wireless extender 3 receives the instruction or command transmitted from the gateway device 2 using the network interface 48 and connection 9. In step S28, the controller 51 of the wireless extender 3 executes one or more programs (e.g., software 50) in the memory 49 to reconfigure, modify, or change the policies of the wireless extender 3 with regard to the collection data and/or reporting for the client device 4 determined to be an immobile device. The wireless extender 3 is re-configured or the data collection policies of the wireless extender 3 are changed so that there is less parameter data collection and/or reporting for client devices 4 determined to be immobile. After step S28, the gateway device 2 will continue to periodically monitor the parameter data in the station metrics data, as in step S20.

In step S24, if the gateway device 2 determines that the steer count is not below the threshold, then the gateway device 2 will monitor the next or more parameter data included in the station metrics data such as the TrafficLevel (e.g., physical data received or download rate) via the wireless extender 3 with respect to a client device 4. In step S25, the controller 26 of the gateway device 2 will compare the TrafficLevel in the station metrics data to a predetermined threshold (e.g., bytes/time) stored in the memory 24. The TrafficLevel can be computed by minute or hourly by the wireless extender 3 based on the data downloaded by the client device 4 and included with the station metrics data in the polling response. The threshold can be set to, for example, 1 Mbytes/minute or greater. However, it is contemplated by the present disclosure that the TrafficLevel (bytes/time) used as the threshold can vary depending on the devices and network being monitored by the gateway device 2. TrafficLevel or downloads is an indication that the client device 4 requires a lot of content or data or is a "hungry" client. A high TrafficLevel and/or downloads by a client device 4 may imply a client device 4 is a TV, STB, or SMD. In step S25, if the gateway device 2 determines that the TrafficLevel or downloads is higher than the predetermined threshold, then the gateway device 2 will classify the client device 4 as an immobile device in step S26.

In step S27, the controller 26 of the gateway device 2 transmits an instruction or command to the wireless extender 3 using the network interface 20 and connection 9 to re-configure or change the policies of wireless extender 3 in step S27. In step S28, the wireless extender 3 receives the instruction or command transmitted from the gateway device 2 using the network interface 48 and connection 9. In step S28, the controller 51 of the wireless extender 3 executes one or more programs (e.g., software 50) in the memory 49 to reconfigure, modify, or change the policies of the wireless extender 3 with regard to the collection data and/or reporting for the client device 4 determined to be an immobile device. The wireless extender 3 is re-configured or the data collection policies of the wireless extender 3 are changed so that there is less parameter data collection and/or reporting for client devices 4 determined to be immobile. After step S28, the gateway device 2 will continue to periodically monitor the parameter data in the station metrics data, as in step S20.

Some Wi-Fi devices in a network are not mobile devices or are considered immobile devices (e.g., TVs, STBs, SMDs, and a wide range of IoT devices). The immobile devices are included with the typical station parameter collection by the wireless extenders (e.g., such that all the station parameter data event handling is performed by the wireless extenders). Additionally, typical station parameter collection by the wireless extenders can result in timely and required reporting operations by the wireless extenders.

Thus, the immobile devices in the wireless network can negatively influence roaming/steering operations and unnecessarily overload the wireless extenders and the MAP control device because the immobile devices rarely require steering operations. Overloading on the wireless extenders and the MAP control device can cause important wireless devices (e.g., requiring roaming/steering operations) to receive delayed roaming and steering operations, thereby affecting QoE.

As a corollary to the flowchart in FIG. 4, it is also contemplated by the present disclosure that if the mobility of a client device 4 is determined to be higher than normal, the controller 26 of the gateway device 2 could transmit an instruction or command to the wireless extender 3 to increase the frequency of data collection and reporting by the wireless extender 3.

The aspects and embodiments of the present disclosure provide optimized data collection in a wireless network by automatically reducing the burden on wireless extenders, backhaul and control devices caused by immobile devices, such that overall system performance and QoE in the wireless network is improved.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute the steps described in FIGS. 3 and 4. For example, the one or more memories stores software or algorithms with executable instructions and the one or more processors can execute a set of instructions of the software or algorithms in association for providing monitoring and installation enhancements in any number of wireless networks in accordance with the embodiments described in the present disclosure.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

I claim:

1. A gateway device for optimizing data collection in a wireless network, the wireless network configured to communicatively interconnect the gateway device, one or more wireless Wi-Fi extenders, and one or more client devices, the gateway device comprising:
a network controller,
a non-transitory memory storing a program; and
a communication interface configured to establish communication connections with the one or more client devices and the one or more wireless Wi-Fi extenders via the wireless network,
wherein the network controller is configured to execute the program to:
receive, using the communication interface, polling responses from the one or more wireless Wi-Fi extenders;
periodically monitor, using the network controller, station metrics data for the one or more client devices based on the polling responses;
determine, using the network controller, which of the one or more client devices is an immobile device based on the station metrics data; and
transmit, using the communication interface, an instruction to at least one wireless Wi-Fi extender for modifying collection or reporting of the station metrics data for any client device determined to be the immobile device.

2. The gateway device of claim 1, wherein the network controller periodically monitors the station metrics data, which includes a received signal strength indicator (RSSI), and
the network controller determines which of the one or more client devices is the immobile device based on a rate of change of the RSSI being less than a predetermined threshold during a period of time.

3. The gateway device of claim 1, wherein the network controller periodically monitors the station metrics data, which includes non-associated (NA)-RSSI and a NA station list, and
the network controller determines which of the one or more client devices is the immobile device based on a rate of change of the NA-RSSI with respect to the NA station list being less than a predetermined threshold during a period of time.

4. The gateway device according to claim 1, wherein the network controller periodically monitors the station metrics data, which includes data uplink rate or data bytes transmitted, and
the network controller determines which of the one or more client devices is the immobile device based on the data uplink rate or data bytes transmitted being less than a predetermined threshold during a period of time.

5. The gateway device according to claim 1, wherein the network controller periodically monitors the station metrics data, which includes a steer count, and
the network controller determines which of the one or more client devices is the immobile device based on the steer count being less than a predetermined threshold during a period of time.

6. The gateway device according to claim 1, wherein the network controller periodically monitors the station metrics data, which includes data traffic level or data bytes received, and
the network controller determines which of the one or more client devices is the immobile device based on the data traffic level or data bytes received being greater than a predetermined threshold during a period of time.

7. The gateway device according to claim 1, wherein the instruction transmitted to the at least one wireless Wi-Fi extender includes a command to re-configure the at least one Wi-Fi wireless extender, and
the collection or the reporting of the station metrics data is modified by reducing parameter data collected or reducing the reporting by the at least one wireless Wi-Fi extender.

8. The gateway device according to claim 1, wherein the network controller is further configured to execute the program to:
determine, using the network controller, which of the one or more client devices is a mobile device based on the station metrics data; and
transmit, using the communication interface, an instruction to the at least one Wi-Fi wireless extender for modifying collection of the station metrics data for any client device determined to be a mobile device,
wherein the instruction transmitted to the at least one wireless Wi-Fi extender includes a command to re-configure the at least one wireless Wi-Fi extender, and
the collection or the reporting of the station metrics data is modified by increasing parameter data collected or increasing the reporting for one or more client devices determined to be a mobile device.

9. The gateway device according to claim 1, wherein the network controller is a multi-access point controller, a mesh network controller, or cloud-based controller.

10. A method for optimized data collection in a wireless network, the wireless network being configured to communicatively interconnect a gateway device, one or more wireless Wi-Fi extenders, and one or more client devices, the method comprising:
receiving, at the one or more wireless Wi-Fi extenders, probe requests from the one or more client devices;
receiving, at the one or more client devices, data via the one or more wireless Wi-Fi extenders;
receiving, at the gateway device, polling responses from the one or more wireless Wi-Fi extenders;
periodically monitoring, at the gateway device, station metrics data for the one or more client devices based on the polling responses and determining which of the one or more client devices is an immobile device based on the station metrics data; and
transmitting, from the gateway device, an instruction to at least one wireless Wi-Fi extender for modifying collection or reporting of the station metrics data for any client device determined to be the immobile device.

11. The method of claim 10, wherein the periodic monitoring of the station metrics data includes monitoring a received signal strength indicator (RSSI), and the determining which of the one or more client devices is the immobile device is based on a rate of change of the RSSI being less than a predetermined threshold during a period of time.

12. The method of claim 10, wherein the periodic monitoring of the station metrics data includes monitoring non-associated (NA)-RSSI and a NA station list, and
the determining which of the one or more client devices is the immobile device is based on a rate of change of the NA-RSSI with respect to the NA station list being less than a predetermined threshold during a period of time.

13. The method according to claim 10, wherein the periodic monitoring of the station metrics data includes monitoring a data uplink rate or data bytes transmitted, and
the determining which of the one or more client devices is the immobile device is based on the data uplink rate or data bytes transmitted being less than a predetermined threshold during a period of time.

14. The method according to claim 10, wherein the periodic monitoring of the station metrics data includes monitoring a steer count, and
the determining which of the one or more client devices is the immobile device is based on the steer count being less than a predetermined threshold during a period of time.

15. The method according to claim 10, wherein the periodic monitoring of the station metrics data includes monitoring a data traffic level or data bytes received, and
the determining which of the one or more client devices is the immobile device is based on the data traffic level or data bytes received being greater than a predetermined threshold during a period of time.

16. The method accordingly to claim 10, wherein the transmitting of the instruction to the at least one wireless Wi-Fi extender includes transmitting a command to re-configure the at least one wireless Wi-Fi extender, and
the collection or the reporting of the station metrics data is modified by reducing parameter collected or reducing the reporting by the at least one wireless Wi-Fi extender for any client device determined to be the immobile device.

17. A non-transitory computer-readable recording medium in a wireless device for optimizing data collection in a wireless network, the wireless network configured to communicatively interconnect the wireless device having a network controller, one or more wireless Wi-Fi extenders, and one or more client devices, the non-transitory computer-readable recording medium storing one or more programs which when executed by the network controller performs steps comprising:
receiving polling responses from the one or more wireless Wi-Fi extenders;
periodically monitoring station metrics data for the one or more client devices based on the polling responses;
determining which of the one or more client devices is an immobile device based on the station metrics data; and
transmitting an instruction to at least one wireless Wi-Fi extender for modifying collection or reporting of the station metrics data for any client device determined to be the immobile device.

18. The non-transitory computer-readable recording medium according to claim 17, wherein the determining which of the one or more client devices is the immobile device is based on the periodic monitoring of the station metrics data including: 1) a first rate of change of a received signal strength indicator (RSSI) being less than a first predetermined threshold during a period of time; 2) a second rate of change of a non-associated (NA)-RSSI with respect to a NA station list being less than a second predetermined threshold during a period of time; 3) a data uplink rate or data bytes transmitted being less than a third predetermined threshold during a period of time; 4) a steer count being less than a fourth predetermined threshold during a period of time; 5) or a data traffic level or data bytes received being greater than a fifth predetermined threshold during a period of time.

19. The non-transitory computer-readable recording medium according to claim 17, wherein the transmitting of the instruction to the at least one wireless Wi-Fi extender includes transmitting a command to re-configure the at least one wireless Wi-Fi extender, and
the collection or the reporting of the station metrics data is modified by reducing parameter collected or reducing the reporting by the at least one wireless Wi-Fi extender for any client device determined to be the immobile device.

20. The non-transitory computer-readable recording medium according to claim 17, wherein the network controller is a multi-access point controller, a mesh network controller, or cloud-based controller.

* * * * *